US012140375B2

(12) United States Patent
Naderer et al.

(10) Patent No.: US 12,140,375 B2
(45) Date of Patent: Nov. 12, 2024

(54) MOUNTING A CERAMIC ROLLER IN A ROLLER HEARTH FURNACE

(71) Applicant: SCHWARTZ GMBH, Simmerath (DE)

(72) Inventors: Christian Naderer, Oberbergkirchen (DE); Andreas Reinartz, Monschau (DE)

(73) Assignee: Schwartz GmbH, Simmerath (DE)

( * ) Notice: Subject to any disclaimer, the term of this patent is extended or adjusted under 35 U.S.C. 154(b) by 0 days.

(21) Appl. No.: 17/798,917

(22) PCT Filed: Mar. 9, 2021

(86) PCT No.: PCT/EP2021/055835
§ 371 (c)(1),
(2) Date: Aug. 11, 2022

(87) PCT Pub. No.: WO2021/180672
PCT Pub. Date: Sep. 16, 2021

(65) Prior Publication Data

US 2023/0065933 A1 Mar. 2, 2023

(30) Foreign Application Priority Data

Mar. 13, 2020 (DE) ..................... 10 2020 107 036.5

(51) Int. Cl.
*F27B 9/24* (2006.01)
*F27D 3/00* (2006.01)

(52) U.S. Cl.
CPC .............. *F27B 9/2407* (2013.01); *F27D 3/00* (2013.01); *F27D 2003/0042* (2013.01)

(58) Field of Classification Search
CPC .......... F27B 9/2407; F27D 3/00; F27D 3/026; F27D 2003/0042
See application file for complete search history.

(56) References Cited

U.S. PATENT DOCUMENTS 4,247,000 A * 1/1981 Marriott, Jr. ............ C03B 29/08 198/780
4,330,268 A * 5/1982 Kremheller ........... F27B 9/2407 198/791

(Continued)

FOREIGN PATENT DOCUMENTS

DE 3006114 A * 9/1981 ............ F27B 9/2407
DE 3006114 C2 5/1987

(Continued)

OTHER PUBLICATIONS

International Search Report, Jun. 4, 2021 (15 pages).

*Primary Examiner* — Bayan Salone
(74) *Attorney, Agent, or Firm* — Occhiuti & Rohlicek LLP

(57) ABSTRACT

Sleeve for mounting a ceramic roller in a roller hearth furnace, the sleeve has a receptacle for one end of the ceramic roller, the receptacle being surrounded by a lateral wall. The lateral wall has, in the axial direction, a waist portion and a clamping portion, wherein a wall thickness (d) of the lateral wall in the waist portion is smaller than in the vicinity of the waist portion, and a cross-sectional area of the receptacle in the clamping portion is smaller than in the vicinity of the clamping portion.
A ceramic roller can be mounted in a roller hearth furnace by the sleeve, even at high temperature. During production, the sleeve is provided with a reduced cross-sectional area in the clamping portion. When the sleeve is pressed axially onto the end of a ceramic roller, the reduced cross-sectional area produces an elastic force, with the sleeve being held on the ceramic roller.

17 Claims, 3 Drawing Sheets

(56) References Cited

U.S. PATENT DOCUMENTS

Figure 1:
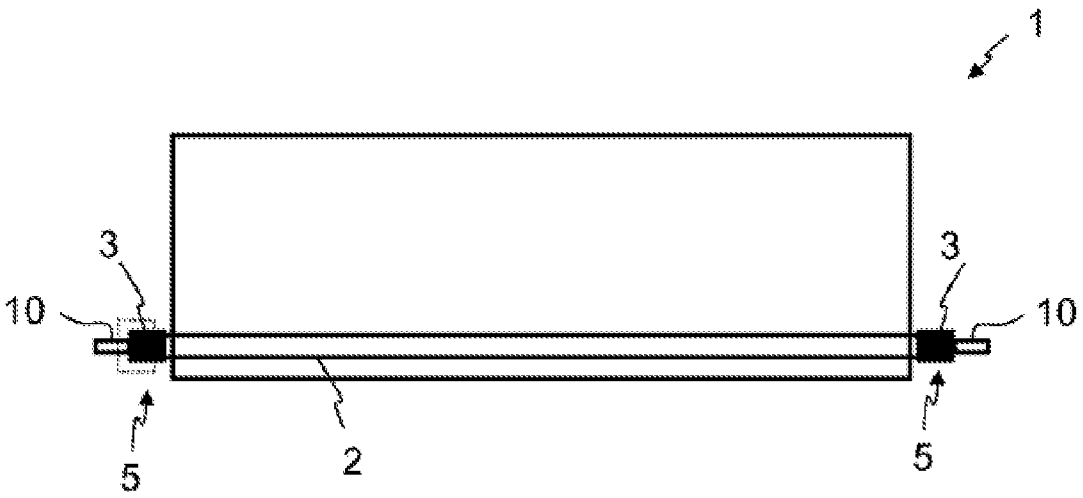

| | | | | | |
|---|---|---|---|---|---|
| 5,048,168 | A | | 9/1991 | Vanaschen et al. | |
| 5,096,051 | A | * | 3/1992 | Abels | F27D 3/026 198/780 |
| 5,169,450 | A | * | 12/1992 | Opad | H01T 19/00 427/535 |

FOREIGN PATENT DOCUMENTS

| | | | | | |
|---|---|---|---|---|---|
| DE | 69008091 | T2 | | 10/1994 | |
| DE | 69513848 | T2 | | 5/2000 | |
| DE | 102011084218 | A1 | * | 12/2012 | F16C 13/00 |
| DE | 202015100449 | U1 | * | 4/2015 | B08B 9/00 |
| DE | 102017105774 | A1 | | 9/2018 | |
| EP | 0615960 | A1 | | 9/1994 | |
| FR | 2550172 | A | * | 2/1985 | B65C 39/07 |
| FR | 2550172 | A1 | | 2/1985 | |
| WO | WO-2018166957 | A1 | * | 9/2018 | F27D 3/026 |

* cited by examiner

MOUNTING A CERAMIC ROLLER IN A ROLLER HEARTH FURNACE

CROSS REFERENCE TO RELATED APPLICATIONS

This application is a U.S. national stage application of International Application no. PCT/EP2021/055835, filed Mar. 9, 2021, which claims the benefit of the filing date of German Application No. 10 2020 107 036.5, filed Mar. 13, 2020, the contents of which are hereby incorporated by reference in their entirety.

The invention relates to a sleeve for mounting a ceramic roller in a roller hearth furnace, to a set comprising a ceramic roller for a roller hearth furnace and such a sleeve, and to a method for mounting such a sleeve on a ceramic roller.

It is known to heat components, in particular made of steel, in a roller hearth furnace. For this purpose, the components can be moved through the roller hearth furnace via a large number of rollers. The rollers are often made of ceramic in order to be able to withstand the high temperatures in the roller hearth furnace.

Various possibilities are known for mounting the rollers of a roller hearth furnace. The connection between the roller made of ceramic and a mounting element made of steel is often problematic. Since steel has a significantly higher coefficient of thermal expansion than ceramic, the excess of the fit of a non-positive connection is reduced at the high operating temperature of such a roller hearth furnace system, provided that the metal sleeve sits on the ceramic from the outside. As a result, the preload is reduced and with it the ability to transmit the drive torque.

It is the object of the present invention, based on the prior art described, to provide a sleeve with which a ceramic roller in a roller hearth furnace can be mounted with sufficient non-positive fit even at high temperature. In addition, a set consisting of such a sleeve and a ceramic roller, as well as a method for mounting such a sleeve on a ceramic roller are to be presented.

These objects are achieved with the subject matter of the independent claims. Further advantageous embodiments are specified in the dependent claims. The features presented in the claims and in the description can be combined with one another in any technologically meaningful way.

According to the invention, a sleeve for mounting a ceramic roller in a roller hearth furnace is presented. The sleeve has a receptacle for one end of the ceramic roller, wherein the receptacle is surrounded by a lateral wall, wherein the lateral wall has, in the axial direction, a waist portion and a clamping portion located therein, wherein a wall thickness of the lateral wall in the waist portion is smaller than in the vicinity of the waist portion, and wherein a cross-sectional area of the receptacle in the clamping portion is smaller than that in the vicinity of the clamping portion.

The sleeve is designed and configured to mount a ceramic roller in a roller hearth furnace. The ceramic roller is preferably one of many ceramic rollers that are arranged in the roller hearth furnace and are intended for transporting components through the roller hearth furnace. With the roller hearth furnace, components, in particular made of steel, can be thermally treated, for example for press hardening. The roller hearth furnace is preferably designed for the thermal treatment of components, in particular for motor vehicles.

The ceramic roller can be mounted over two of the sleeves in the roller hearth furnace. The ceramic roller is preferably mounted at both of the ends thereof via a corresponding sleeve. These two sleeves are preferably of identical design. To mount the ceramic roller, the ends of the ceramic roller are inserted into the corresponding receptacle of the sleeves. During operation, the sleeve is non-positively connected to the ceramic roller. The sleeve is preferably positively connected to a drive and mounting device, for example via a hexagonal fit. The part of the drive and mounting device, which part is connected to the sleeve, is rotatably held in the remaining part of the drive and mounting device. This remaining part is stationary. In this respect, the sleeve represents an adapter between the drive and mounting device on one side and the ceramic roller on the other. The ceramic roller thus receives a connection through the sleeve, via which the ceramic roller can be connected to the drive and mounting device.

To describe the sleeve, two axial portions of the lateral wall are defined: the waist portion and the clamping portion. The clamping portion is located inside the waist portion. This means that the clamping portion does not protrude beyond the waist portion on one side or on both sides and also does not coincide with the waist portion. In addition to the waist portion and the clamping portion, the lateral wall preferably has further axial portions. It is particularly preferred that the waist portion is spaced apart from the end faces of the receptacle. The waist portion and the clamping portion are defined by the conditions described below. In addition, it is not necessary for the waist portion and the clamping portion to be identified as such. In particular, it is possible that different portions can be identified as a waist portion and/or that different portions can be identified as a clamping portion. It is sufficient that one portion can be identified as a waist portion and that one portion can be identified as a clamping portion; alternative possible assignments of the portions are irrelevant.

The waist portion is defined in that the wall thickness of the lateral wall is smaller therein than in the vicinity of the waist portion. This means that the wall thickness of the lateral wall is reduced in the waist portion. While this is preferred, the wall thickness of the lateral wall does not have to be constant in the waist portion. It is preferred, but not necessary, for the wall thickness of the lateral wall to also be constant outside of the waist portion. The term "constant" in both statements refers to the fact that the wall thickness remains unchanged when viewed along the axial direction.

Since the waist portion is defined axially, the "vicinity of the waist portion" is to be understood as meaning those portions of the lateral wall that are axially adjacent to the waist portion. The wall thickness of the lateral wall does not have to be constant in these portions either. The wall thickness of the lateral wall at the edges of the waist portion is decisive as the wall thickness of the lateral wall in the "vicinity of the waist portion." These edges are not considered part of the waist portion.

When viewed in the circumferential direction, the wall thickness is preferably constant, which applies in particular to the entire lateral wall. If the wall thickness should vary in the circumferential direction, any axial portion of the lateral wall can be considered a waist portion for which the condition that the wall thickness of the lateral wall in this portion is smaller than in the vicinity of this portion is met over at least part of the circumference of the lateral wall. The condition that the wall thickness of the lateral wall in the waist portion is smaller than in the vicinity of the waist portion is preferably met in the waist portion over the entire circumference of the lateral wall. Since an axial portion is considered, the "vicinity of this portion" is also defined in the axial direction. Therefore, only the vicinity of the portion at the corresponding location in the circumferential direction is decisive.

In the waist portion, the wall thickness of the lateral wall is preferably in the range of 0.5 to 1.0 mm. In the vicinity of the waist portion, the wall thickness of the lateral wall is preferably in the range of 1 to 2 mm.

The clamping portion is defined in that the cross-sectional area of the receptacle therein is smaller than in the vicinity of the clamping portion. The cross-sectional area of the receptacle indicates the area of the two-dimensional extension of the receptacle when viewed perpendicularly to the axis of the receptacle. The receptacle is the space surrounded by the lateral wall. The cross-sectional area of the receptacle is therefore the area which is delimited by the inside of the lateral wall, when viewed perpendicularly to the axis of the lateral wall. The fact that the cross-sectional area of the receptacle in the clamping portion is smaller than in the vicinity of the clamp portion means that the cross-sectional area of the receptacle in the clamping portion is reduced. While this is preferred, the cross-sectional area of the receptacle in the clamping portion does not have to be constant. Also outside of the clamping portion, it is preferable but not necessary for the cross-sectional area of the receptacle to be constant. The term "constant" in both statements refers to the fact that the cross-sectional area remains unchanged when viewed along the axial direction.

Since the clamping portion is defined axially, the "vicinity of the clamping portion" is to be understood as meaning those portions of the lateral wall that are axially adjacent to the clamping portion. The cross-sectional area of the receptacle does not have to be constant in these portions either. The cross-sectional area of the receptacle at the edges of the clamping portion is decisive as the cross-sectional area of the holder in the "vicinity of the clamping portion." These edges are not considered part of the clamping portion.

If the receptacle is cylindrical, the diameter of the receptacle in the clamping portion is smaller than in the vicinity of the clamping portion. However, it is not necessary for the receptacle to be exactly cylindrical. It is even preferable for the receptacle to be deformed in relation to a cylindrical shape, at least in the clamping portion. To emphasize this possibility, the term diameter—which, by mathematical definition, refers to a circular cross section—is not used for such a deformed receptacle. Instead, the distance of the inside of the lateral wall from the axis of the lateral wall shall be considered. In the case of a cylindrical receptacle, this distance corresponds to the radius thereof. The fact that the cross-sectional area of the receptacle in the clamping portion is smaller than in the vicinity of the clamping portion can be achieved in particular by the fact that the distance between the inside of the lateral wall and the axis of the lateral wall in the clamping portion is smaller than in the vicinity of the clamping portion.

The distance between the inside of the lateral wall and the axis of the lateral wall does not have to be constant when viewed in the circumferential direction. In this respect, the lateral wall can deviate from a rotationally symmetrical shape. If the distance between the inside of the lateral wall and the axis of the lateral wall varies in the circumferential direction, any axial portion of the lateral wall for which the distance between the inside of the lateral wall and the axis of the lateral wall is smaller than in the vicinity of this portion can be considered a clamping portion. The middle refers to a plane perpendicular to the axis of the lateral wall. The condition that the distance between the inside of the lateral wall and the axis of the lateral wall in the clamping portion is smaller than in the vicinity of the clamping portion is preferably met in the clamping portion over the entire circumference of the lateral wall. Since an axial portion is considered, the "vicinity of this portion" is also defined in the axial direction. Therefore, only the vicinity of the portion at the corresponding location in the circumferential direction is decisive.

The distance of the inside of the lateral wall from the axis of the lateral wall is preferably in the range of 24 to 100 mm in the vicinity of the clamping portion. The distance between the inside of the lateral wall and the axis of the lateral wall in the clamping portion is preferably 0.15 to 1.00 mm smaller than in the vicinity of the clamping portion. A comparatively very small deformation of the lateral wall is therefore sufficient.

A ceramic roller can be mounted particularly reliably in a roller hearth furnace by means of the sleeve, even at high temperature. The plastic deformation of the clamping portion during the production of the sleeves results in a reduced cross-sectional area in the clamping portion. During assembly of the sleeve, this cross-sectional area is elastically widened in such a way that the minimum distance between the inside of the lateral wall and the axis of the lateral wall in the clamping portion corresponds to the resulting cross-sectional area of the ceramic roller. The resulting radial force between the ceramic roller and the sleeve is so high that a drive torque can be transmitted via the sleeve to the ceramic roller in a non-positive manner. It is preferred that the radial force is not higher than the value to be endured by the ceramic roller. It has been found that the radial force due to the described design of the sleeve is sufficiently high for a non-positive connection between the sleeve and the ceramic roller, even at high temperature and despite the reduced excess due to the different thermal expansion coefficients of the sleeve and the ceramic roller. The resilience of the clamping portion is preferably designed such that there is no permanent, i.e. plastic, deformation of the clamping portion in any operating state.

The lateral wall is preferably closed in the circumferential direction. This applies at least to an axial portion, in particular at least to the waist portion and/or to the clamping portion. The lateral wall is particularly preferably completely closed. Openings on the end faces are not openings in the lateral wall. In particular, the lateral wall has no axial slots. Such a configuration could be provided in order to compensate for the different extension of the ceramic roller and the sleeve via a spring effect that can be achieved therewith. However, since the rigidity of the sleeve is very limited with this design, the required preload can only be maintained in a very limited range with this design. Due to the configuration, in particular with the waist portion and the clamping portion, such slots are not required. Consequently, the slots can be dispensed with, thus increasing the stability of the sleeve and the connection to the ceramic roller. In addition, production is simplified because no slots have to be produced and, in this respect, a production step is eliminated.

In a preferred embodiment of the sleeve, the wall thickness of the lateral wall in the waist portion is 20 to 60% of the wall thickness of the lateral wall in the vicinity of the waist portion.

It has been found that the described advantage of the reduced wall thickness can be achieved and that the lateral wall is also sufficiently stable in the waist portion.

In a further preferred embodiment of the sleeve, the cross-sectional area of the receptacle in the clamping portion is 0.03 to 0.3% smaller than in the vicinity of the clamping portion.

It has been found that the described advantage of the reduced cross-sectional area can be achieved and that the sleeve can be pressed onto the ceramic roller without damaging the ceramic roller.

In a further preferred embodiment of the sleeve, an axial extension of the clamping portion is at least 70% of an axial extension of the waist portion.

In particular, it is preferred that the axial extension of the clamping portion is between 70% and 90% of an axial extension of the waist portion.

In a further preferred embodiment of the sleeve, the waist portion has an axial extension in the range of 40 to 80% of an axial extension of the receptacle.

It has been found that the described advantage of the reduced wall thickness can be achieved and that the lateral wall is sufficiently stable.

As a further aspect of the invention, a set is presented which comprises a ceramic roller for a roller hearth furnace and a sleeve for mounting the ceramic roller in the roller hearth furnace. The sleeve has a receptacle for one end of the ceramic roller, wherein the receptacle is surrounded by a lateral wall, the lateral wall has, in the axial direction, a waist portion and a clamping portion located therein, wherein a wall thickness of the lateral wall in the waist portion is smaller than in the vicinity of the waist portion, and a cross-sectional area of the receptacle is smaller only in the clamping portion than a cross-sectional area of the end of the ceramic roller.

The special advantages and design features of the sleeve described can be applied and transferred to the set, and vice versa. The sleeve of the set is preferably designed like the sleeve described above. The sleeve is not pressed onto the ceramic roller in the set. Nevertheless, the sleeve is intended and set up to be pressed onto the ceramic roller. Preferably, the set comprises two sleeves. In this case, one of the sleeves can be pressed onto each end of the ceramic roller.

The cross-sectional area of the receptacle in the clamping portion is smaller than in the vicinity of the clamping portion in this respect in that the cross-sectional area of the receptacle is smaller than the cross-sectional area of the end of the ceramic roller only in the clamping portion. The cross-sectional area of the end of the ceramic roller is the area that covers the outside of the ceramic roller, when viewed perpendicularly to the axis of the ceramic roller at the end of the ceramic roller. The end of the ceramic roller is the part of the ceramic roller that is received by the sleeve. If the cross-sectional area of the ceramic roller is not constant at the end, an average is decisive. Outside the clamping portion, the cross-sectional area of the receptacle is therefore equal to or larger than the cross-sectional area of the end of the ceramic roller. If the sleeve is pressed onto the ceramic roller, the sleeve is held on the ceramic roller in particular via the clamping portion. This is a clamping connection, which explains the term clamping portion.

As a further aspect of the invention, a method for mounting a sleeve on a ceramic is roller for a roller hearth furnace is presented. The sleeve is designed for mounting the ceramic roller in the roller hearth furnace, wherein the sleeve has a receptacle for one end of the ceramic roller, wherein the receptacle is surrounded by a lateral wall, wherein the lateral wall has, in the axial direction, a waist portion, wherein a wall thickness of the lateral wall in the waist portion is smaller than in the vicinity of the waist portion, and wherein the method comprises:

a) radial pressing of the sleeve in a clamping portion located in the waist portion, wherein the lateral wall is acted upon at at least three locations of the lateral wall by a force pointing radially inward in each case,
b) axial pressing of the sleeve onto the end of the ceramic roller.

The described special advantages and design features of the sleeve and the set can be applied and transferred to the method, and vice versa. The sleeve described, in particular the sleeve of the set described, is preferably obtained by means of step a) of the method. After step a), the sleeve is preferably designed like the sleeve described, in particular like the sleeve of the set described. Step b) of the method can be carried out accordingly with the sleeve described and in particular with the set described. Step b) is preferably carried out with a device for axially pressing the sleeve onto the end of the ceramic roller. The device preferably has a hydraulic drive in order to apply the force required for the axial pressing. The method is preferably carried out twice for each ceramic roller by pressing a corresponding sleeve onto each end of the ceramic roller.

In a preferred embodiment of the method, the cross-sectional area of the receptacle in the clamping portion becomes smaller than the cross-sectional area of the end of the ceramic roller by means of step b).

The receptacle therefore initially has a cross-sectional area that is larger than or equal to the cross-sectional area of the end of the ceramic roller. The cross-sectional area of the receptacle is preferably constant over the entire receptacle. In particular, the cross section of the receptacle is preferably circular throughout the receptacle. The same applies to the end of the roller. By means of the radial pressing in step a), the cross-sectional area of the receptacle in the clamping portion is reduced and is therefore smaller than the cross-sectional area of the end of the ceramic roller. Outside the clamping portion, however, the cross-sectional area of the receptacle remains larger than or equal to the cross-sectional area of the end of the ceramic roller.

In a further preferred embodiment of the method, the sleeve is pressed in step b) with at least three press jaws, which each extend circumferentially over an angular region of 10 to 60° of the lateral wall and/or which each extend axially over at least 80% of the waist portion of the lateral wall.

Exactly three press jaws are preferably used. A radially inward-pointing force can be exerted on the lateral wall by each of the press jaws. The press jaws are preferably shaped to match the lateral wall. The lateral wall is deformed, for example starting from a cylindrical shape, by the press jaws which are preferably arranged uniformly distributed over the circumference of the lateral wall.

The sleeve is preferably pressed in step b) with at least three press jaws which each extend circumferentially over an angular region of 10 to 60° of the lateral wall and which each extend axially over at least 80% of the waist portion of the lateral wall.

Figure 2:
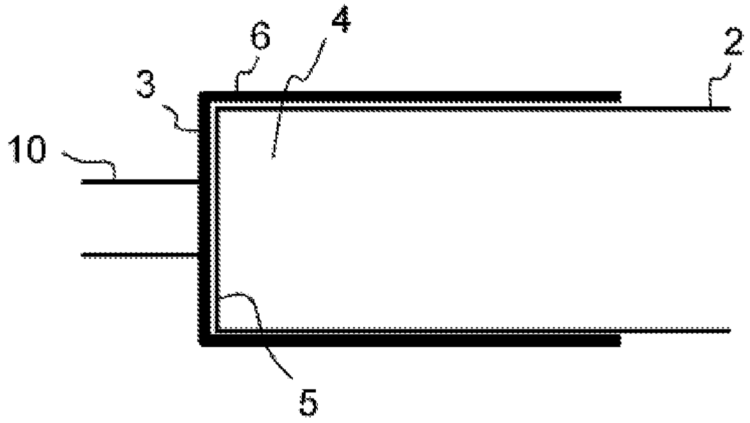
Figure 3:
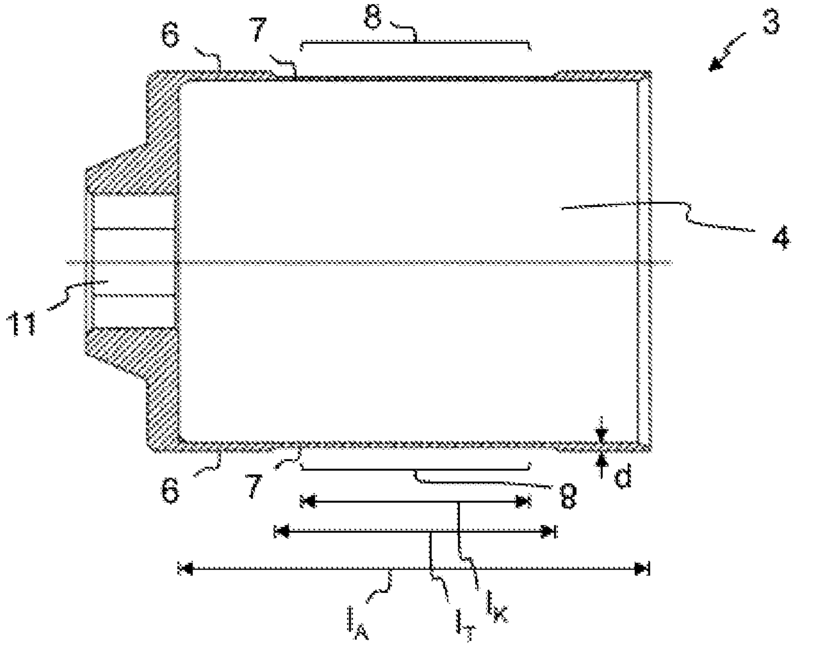
Figure 4:
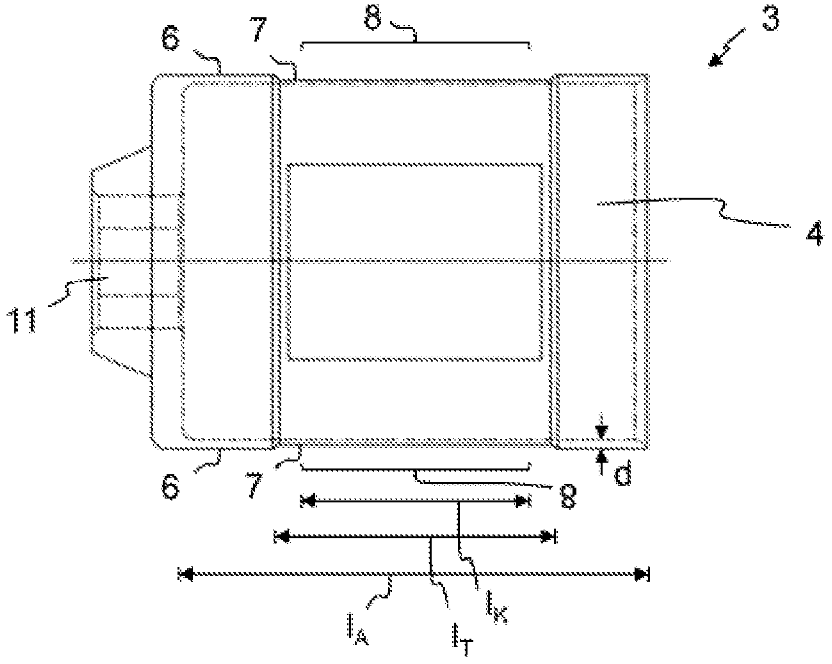
Figure 5:
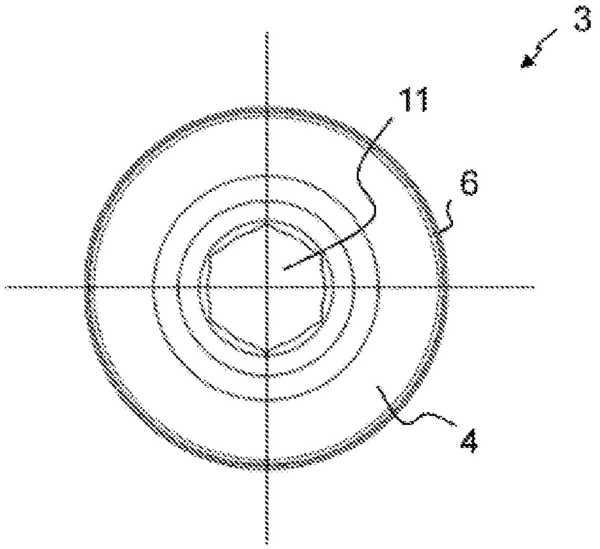

The invention is explained in more detail below with reference to the drawings. The drawings show a particularly preferred embodiment, to which the invention is not limited, however. In the drawings:

FIG. 1: is a schematic sectional view of a roller hearth furnace having a ceramic roller which is mounted on two sleeves according to the invention, FIG. 2: is a schematic enlargement of a part of FIG. 1, FIG. 3: is a sectional view of the sleeve from FIG. 2, FIG. 4: is a side view of the sleeve from FIGS. 2 and 3, FIG. 5: is a cross-sectional view of the sleeve from FIGS. 2 to 4, FIG. 6: is a cross-sectional view of a part of a sleeve before radial pressing with a press jaw.

FIG. 1 shows a roller hearth furnace 1 with a large number of ceramic rollers 2, one of which can be seen. The ceramic roller 2 is connected at both of the ends 5 thereof via a corresponding sleeve 3 according to the invention to a corresponding (only indicated) drive and mounting device 10 and, in this respect, is mounted via the sleeves 3. The part of FIG. 1 which is shown enlarged in FIG. 2 is drawn in dashed lines.

It can be seen in FIG. 2 that the end of the ceramic roller 2 is received in a receptacle 4 of the sleeve 3. The receptacle 4 is surrounded by a lateral wall 6. This is shown in this case simplified with constant inside and outside radius. A gap is drawn in between the ceramic roller 2 and the sleeve 3. This is only for illustration in the view. In fact, the ceramic roller is circumferentially in contact with at least part of the lateral wall 6. The drive and mounting device 10 is also indicated in FIG. 2.

FIG. 3 is a detailed and true-to-scale sectional view of the sleeve 3 from FIGS. 1 and 2 before assembly on the ceramic roller 2. It can be seen in FIG. 3 that the receptacle 4 is surrounded by a lateral wall 6, with the lateral wall 6 having a waist portion 7 in the axial direction and a clamping portion 8 located therein. A wall thickness d of the lateral wall 6 in the waist portion 7 is smaller than in the vicinity of the waist portion 7. A cross-sectional area of the receptacle 4 in the clamping portion 8 is smaller than in the vicinity of the clamping portion 8. However, this deviation is too small to be able to be recognized in the view of FIG. 3. The reduced cross-sectional area was achieved by means of step a) of the method according to the invention, after which the sleeve 3 is radially pressed in the clamping portion 8, wherein the lateral wall 6 is acted upon at at least three locations of the lateral wall 6 by a force pointing radially inward in each case.

With step b) of the method according to the invention, the sleeve 3 can be mounted on the ceramic roller 2 in order to be used in the roller hearth furnace 1 from FIGS. 1 and 2. For this purpose, the sleeve 3 is pressed axially onto the end 5 of the ceramic roller 2 and, in this respect, is connected to the ceramic roller 2 in a non-positive manner.

Also shown are an axial extension $l_T$ of the waist portion 7 and an axial extension $l_K$ of the clamping portion 8. In addition, an axial extension $l_A$ of the receptacle 4 is shown.

Furthermore, a hexagon socket 11 can be seen, via which the sleeve 3 can be positively connected to the drive and mounting device 10.

FIG. 4 is a side view of the sleeve 3 shown in FIGS. 2 and 3. FIG. 5 is a cross-sectional view of this sleeve 3.

Figure 6:
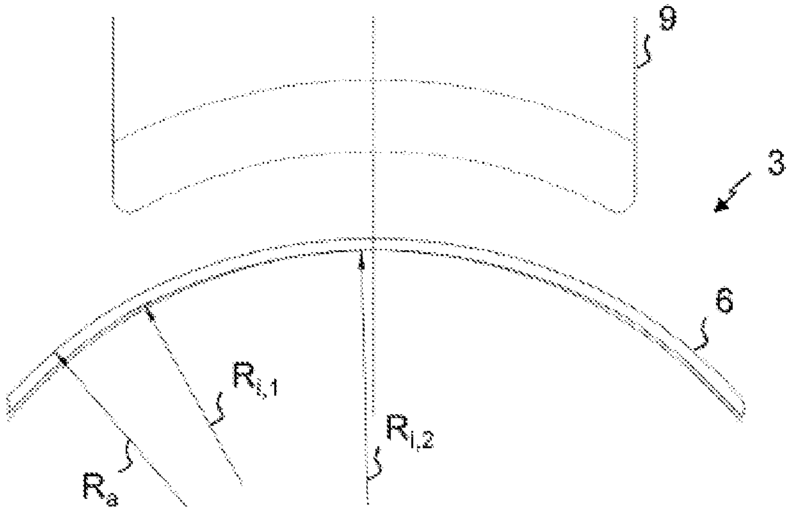

FIG. 6 is a cross-sectional view of part of a sleeve 3 before radial pressing according to step b). From the sleeve 3 shown, the sleeve 3 from FIGS. 2 to 5 can be obtained by the radial pressing. Before radial pressing, the lateral wall 6 has a cylindrical shape. The lateral wall 6 is slightly deformed by radial pressing. $R_{i,1}$ and $R_{i,2}$ designate two distances between the inside of the lateral wall 6 and the axis of the lateral wall 6 (located outside the detail in FIG. 6). In addition, Ra denotes a distance between the outside of the lateral wall 6 and the axis of the lateral wall 6 (located outside the detail in FIG. 6). In the situation shown before radial pressing, the following applies: $R_{i,1}=R_{i,2}$. Radial pressing can be done with a press jaw 9, among other things. The pressing preferably takes place with at least three press jaws which are designed like the press jaw 9 shown and which are distributed evenly over the circumference of the sleeve 3. Due to the radial pressing, $R_{i,2}$ is more strongly influenced than $R_{i,1}$ due to the arrangement of the press jaw 9. The wall thickness remains unchanged during radial pressing.

A ceramic roller 2 can be mounted particularly reliably in a roller hearth furnace 1 by means of the sleeve 3, even at high temperature. To achieve this, during production the sleeve 3 is provided with a reduced cross-sectional area in the clamping portion 8. When the sleeve 3 is pressed axially onto the end 5 of a ceramic roller 2, the reduced cross-sectional area in the clamping portion 8 produces an elastic force, by means of which the sleeve 3 is held on the ceramic roller 2.

LIST OF REFERENCE SIGNS

1 Roller hearth furnace
2 Ceramic roller
3 Sleeve
4 Receptacle
5 End
6 Lateral wall
7 Waist portion
8 Clamping portion
9 Press jaw
10 Drive and mounting device
11 Hexagon socket
d Wall thickness
$l_T$ Axial extension of the waist portion
$l_K$ Axial extension of the clamping portion
$l_A$ Axial extension of the receptacle
$R_{i,1}$ Inner distance before radial pressing
$R_{i,2}$ Inner distance before radial pressing
$R_a$ Outer distance before radial pressing

The invention claimed is:

1. Sleeve for mounting a ceramic roller in a roller hearth furnace, wherein the sleeve has a receptacle for one end of the ceramic roller, wherein the receptacle is surrounded by a lateral wall, wherein the lateral wall has, in the axial direction, a waist portion and a clamping portion, the clamping portion being located inside the waist portion, such that the clamping portion does not protrude beyond or coincide with the waist portion, wherein a wall thickness (d) of the lateral wall in the waist portion is smaller than a wall thickness (d) of first and second portions of the lateral wall that are on respective first and second sides of the waist portion, and wherein a cross-sectional area of the receptacle in the clamping portion is smaller than a cross-sectional area of the receptacle that is adjacent to the clamping portion.

2. Sleeve according to claim 1, wherein the wall thickness (d) of the lateral wall in the waist portion is 20 to 60% of the wall thickness (d) of the lateral wall than that which is adjacent to the waist portion.

3. Sleeve according to claim 1, wherein the cross-sectional area of the receptacle in the clamping portion is 0.03 to 0.3% smaller than that which is adjacent to the clamping portion.

4. Sleeve according to claim 1, wherein an axial extension ($l_K$) of the clamping portion is at least 70% of an axial extension ($l_T$) of the waist portion.

5. Sleeve according to claim 1, wherein the waist portion has an axial extension ($l_T$) in the range of 40 to 80% of an axial extension ($l_A$) of the receptacle.

6. Set comprising a ceramic roller for a roller hearth furnace and a sleeve for mounting the ceramic roller in the roller hearth furnace, wherein the sleeve has a receptacle for one end of the ceramic roller, wherein the receptacle is surrounded by a lateral wall, wherein the lateral wall has, in the axial direction, a waist portion and a clamping portion, the clamping portion being located inside the waist portion, such that the clamping portion does not protrude beyond or coincide with the waist portion, wherein a wall thickness (d) of the lateral wall in the waist portion is smaller than a wall thickness (d) of first and second portions of the lateral wall that are on respective first and second sides of the waist portion, and wherein a cross-sectional area of the receptacle is smaller only in the clamping portion than a cross-sectional area of the end of the ceramic roller.

7. Method for mounting a sleeve on a ceramic roller for a roller hearth furnace, wherein the sleeve for mounting the ceramic roller in the roller hearth furnace is formed, wherein the sleeve has a receptacle for one end of the ceramic roller, wherein the receptacle is surrounded by a lateral wall, wherein the lateral wall has, in the axial direction, a waist portion, the clamping portion being located inside the waist portion, such that the clamping portion does not protrude beyond or coincide with the waist portion, wherein a wall thickness (d) of the lateral wall in the waist portion is smaller than a wall thickness (d) of first and second portions of the lateral wall that are on respective first and second sides of the waist portion, and wherein the method comprises:

a) radial pressing of the sleeve in a clamping portion located in the waist portion, wherein the lateral wall is acted upon at at least three locations of the lateral wall by a force pointing radially inward in each case, b) axial pressing of the sleeve onto the end of the ceramic roller.

8. Method according to claim 7, wherein the sleeve after step a) is configured according to claim 1.

9. Method according to claim 7, wherein the cross-sectional area of the receptacle in the clamping portion becomes smaller than the cross-sectional area of the end of the ceramic roller by means of step b).

10. Method according to claim 7, wherein the sleeve is pressed in step b) with at least three press jaws which each extend circumferentially over an angular region of 10 to 60° of the lateral wall and/or which each extend axially over at least 80% of the waist portion of the lateral wall.

11. Sleeve according to claim 2, wherein the cross-sectional area of the receptacle in the clamping portion is 0.03 to 0.3% smaller than that which is adjacent to the clamping portion.

12. Sleeve according to claim 2, wherein an axial extension (lK) of the clamping portion is at least 70% of an axial extension (lT) of the waist portion.

13. Sleeve according to claim 2, wherein the waist portion has an axial extension (lT) in the range of 40 to 80% of an axial extension (lA) of the receptacle.

14. Sleeve according to claim 3, wherein an axial extension (lK) of the clamping portion is at least 70% of an axial extension (lT) of the waist portion.

15. Sleeve according to claim 3, wherein the waist portion has an axial extension (lT) in the range of 40 to 80% of an axial extension (lA) of the receptacle.

16. Sleeve according to claim 4, wherein the waist portion has an axial extension (lT) in the range of 40 to 80% of an axial extension (lA) of the receptacle.

17. Sleeve according to claim 1, wherein the cross-sectional area of the receptacle in the clamping portion is smaller than a cross-sectional area of first and second portions of the receptacle on respective first and second sides of the clamping portion.

* * * * *